US011506811B2

(12) United States Patent
Zhang et al.

(10) Patent No.: US 11,506,811 B2
(45) Date of Patent: Nov. 22, 2022

(54) MAGNETIC COMPENSATION METHOD BASED ON AEROMAGNETIC COMPENSATION ERROR MODEL

(71) Applicant: Aerospace Information Research Institute, Chinese Academy of Sciences, Beijing (CN)

(72) Inventors: Qunying Zhang, Beijing (CN); Peilin Wu, Beijing (CN); Luzhao Chen, Beijing (CN); Guangyou Fang, Beijing (CN); Wanhua Zhu, Beijing (CN)

(73) Assignee: Aerospace Information Research Institute, Chinese Academy of Sciences, Beijing (CN)

( * ) Notice: Subject to any disclaimer, the term of this patent is extended or adjusted under 35 U.S.C. 154(b) by 196 days.

(21) Appl. No.: 16/652,333

(22) PCT Filed: Sep. 30, 2017

(86) PCT No.: PCT/CN2017/104775
§ 371 (c)(1),
(2) Date: Mar. 30, 2020

(87) PCT Pub. No.: WO2019/061403
PCT Pub. Date: Apr. 4, 2019

(65) Prior Publication Data
US 2020/0301040 A1    Sep. 24, 2020

(51) Int. Cl.
*G01V 3/38* (2006.01)
*G01V 3/16* (2006.01)
*G01V 3/40* (2006.01)

(52) U.S. Cl.
CPC ............. *G01V 3/38* (2013.01); *G01V 3/16* (2013.01); *G01V 3/40* (2013.01)

(58) Field of Classification Search
CPC .............. G01V 3/38; G01V 3/16; G01V 3/40
See application file for complete search history.

(56) References Cited

U.S. PATENT DOCUMENTS

| 5,182,514 A | 1/1993 | Rice, Jr. |
| 6,130,534 A | 10/2000 | Huang et al. |
(Continued)

FOREIGN PATENT DOCUMENTS

| CN | 104678448 | 6/2015 |
| CN | 105301666 | 2/2016 |
(Continued)

OTHER PUBLICATIONS

Zhou et al., "Attitude affection and correction of aircraft in airborne survey", Global Geology, vol. 34, No. 1, dated Mar. 2015, 6 pages, English Abstract, cited in the International Search Report.
(Continued)

*Primary Examiner* — Alexander Satanovsky
*Assistant Examiner* — Lynda Dinh
(74) *Attorney, Agent, or Firm* — Hamre, Schumann, Mueller & Larson, P.C.

(57) ABSTRACT

A magnetic compensation method based on an aeromagnetic compensation error model includes: acquiring an upper limit of an error of a magnetic noise caused by both an environmental background field in an exploration area and an aeromagnetic flight platform, by using the aeromagnetic compensation error model, before an actual flight; determining, according to the upper limit, whether the environmental background field and the aeromagnetic flight platform are suitable for the actual flight, and if so, performing a calibration flight to acquire a compensation coefficient; and acquiring data of an attitude term by performing the actual flight, calculating an interference magnetic field by the data
(Continued)

of the attitude term and the compensation coefficient, and performing magnetic compensation.

5 Claims, 5 Drawing Sheets

(56) References Cited

U.S. PATENT DOCUMENTS

| | | | |
|---|---|---|---|
| 6,765,383 B1* | 7/2004 | Barringer | G01V 3/16 |
| | | | 324/330 |
| 7,262,601 B2* | 8/2007 | Dransfield | G01V 3/165 |
| | | | 324/331 |
| 9,229,084 B2* | 1/2016 | Tu | G01R 33/0035 |
| 9,671,226 B2* | 6/2017 | Morrison | G01R 33/0035 |
| 2009/0284258 A1 | 11/2009 | Morrison et al. | |
| 2016/0178371 A1 | 6/2016 | Morrison et al. | |
| 2017/0299761 A1* | 10/2017 | Gong | G01V 3/081 |
| 2018/0210039 A1* | 7/2018 | Shalev | G01R 33/032 |

FOREIGN PATENT DOCUMENTS

| | | |
|---|---|---|
| CN | 105425304 | 3/2016 |
| CN | 105676302 | 6/2016 |
| CN | 106707352 | 5/2017 |
| CN | 106842344 | 6/2017 |
| CN | 106959471 | 7/2017 |
| CN | 107356978 | 11/2017 |

OTHER PUBLICATIONS

Wu et al., "Aeromagnetic compensation method for the interference magnetic fields caused by system delay", Chinese Journal of Scientific Instrument, vol. 38, No. 6, dated Jun. 2017, 11 pages, English Abstract, cited in the International Search Report.
International Search Report, issued in the corresponding PCT application No. PCT/CN2017/104775, dated Jun. 19, 2018, 8 pages.
First Chinese Office Action, issued in the corresponding Chinese patent application 201780095496.7, dated Sep. 30, 2022, 13 pages (including translation).

* cited by examiner

MAGNETIC COMPENSATION METHOD BASED ON AEROMAGNETIC COMPENSATION ERROR MODEL

CROSS-REFERENCE TO RELATED APPLICATION(S)

This application corresponds to PCT Application PCT/CN2017/104775, filed on Sep. 30, 2017, which is incorporated herein by reference in its entirety.

TECHNICAL FIELD

The present disclosure belongs to a field of geophysical aeromagnetic exploration, and relates to a magnetic compensation method based on an aeromagnetic compensation error model.

BACKGROUND

Aeromagnetic exploration, as an important aerial geophysical survey method, has been widely used in the field of geophysics. The exploration method has significant advantages such as high efficiency, safety, reliability etc. In an aeromagnetic exploration process, a device carrying platform is usually a fixed wing, a helicopter, etc., in which an optically pumped magnetometer is usually fixed on the carrying platform. Because an aircraft is made of a ferromagnetic material, in a geomagnetic field environment, the aircraft itself may generate an interference magnetic field signal to a signal detected by the optically pumped magnetometer. This interference magnetic field may cause failure to extract valid magnetic anomaly information from magnetic measurement data. Therefore, it is of great significance to effectively compensate for the interference magnetic field of the aircraft.

At present, foreign magnetic compensation devices, for example, AADC series magnetic compensators from the RMS company and aeromagnetic compensation devices from the PICO company, are mainly used in the field of aeromagnetic exploration in domestic. A compensation algorithm for the above compensation devices is based on the conventional aeromagnetic compensation algorithm design, and is characterized in that data collected by an optically pumped magnetometer and a fluxgate magnetometer is firstly passed through a low-pass filter to remove some noises which are not related to a magnetic interference of the aircraft therefrom, and then is subjected to the least square algorithm to achieve the purpose of removing an interference magnetic field of the aircraft.

SUMMARY

The present disclosure provides a magnetic compensation method for performance quality assessment by using an aeromagnetic compensation error model.

According to an aspect of the present disclosure, the present disclosure discloses a magnetic compensation method based on an aeromagnetic compensation error model, comprising: acquiring an upper limit of an error of a magnetic noise by using the aeromagnetic compensation error model, before an aeromagnetic flight, wherein the magnetic noise is caused by both an environmental background field in an exploration area and an aeromagnetic flight platform; determining, according to the upper limit of the error of the magnetic noise, whether the environmental background field and the aeromagnetic flight platform are suitable for an aeromagnetic survey flight, and if so, performing a calibration flight to acquire a compensation coefficient; and acquiring data of an attitude term by performing an actual flight, calculating an interference magnetic field by the data of the attitude term and the compensation coefficient acquired during the calibration flight, and performing magnetic compensation.

In some embodiments of the present disclosure, the aeromagnetic compensation error model is established by: acquiring various interference magnetic fields, and acquiring errors of magnetic interferences corresponding to the interference magnetic fields based on expressions of the respective interference magnetic fields, so as to acquire a total magnetic interference error.

In some embodiments of the present disclosure, the various interference magnetic fields comprise: a constant interference magnetic field, an induced interference magnetic field, and an eddy current interference magnetic field, and the total magnetic interference error in the aeromagnetic compensation error model satisfies:

$$Error_T = error_P + error_I + error_E$$

$$error_P = \frac{\partial H_{PERM}}{\partial T}\Delta T + \frac{\partial H_{PERM}}{\partial L}\Delta L + \frac{\partial H_{PERM}}{\partial V}\Delta V$$

$$error_I = \frac{\partial H_{IND}}{\partial T}\Delta T + \frac{\partial H_{IND}}{\partial L}\Delta L + \frac{\partial H_{IND}}{\partial V}\Delta V$$

$$error_E = \frac{\partial H_{EDDY}}{\partial T}\Delta T + \frac{\partial H_{EDDY}}{\partial L}\Delta L + \frac{\partial H_{EDDY}}{\partial V}\Delta V$$

wherein $Error_T$ is the total magnetic interference error; $error_P$ is an error of a constant magnetic interference; $error_I$ is an error of an induced magnetic interference; $error_E$ is an error of an eddy current magnetic interference; $H_{PERM}(t)$ is the constant interference magnetic field; $H_{IND}(t)$ is the induced interference magnetic field; $H_{EDDY}(t)$ is the eddy current interference magnetic field; $T(t)$, $L(t)$ and $V(t)$ are outputs of a three-axis fluxgate magnetometer in three directions; and $\Delta T$, $\Delta V$ and $\Delta L$ are error levels of measured values of the fluxgate in three directions respectively.

In some embodiments of the present disclosure, the constant interference magnetic field $H_{PERM}(t)$ satisfies:

$$H_{PERM}(t) = c_1 u_1 + c_2 u_2 + c_3 u_3$$
$$= A_1 c_1 + A_2 c_2 + A_3 c_3,$$

the induced interference magnetic field $H_{IND}(t)$ satisfies:

$$H_{IND}(t) = H_e(t)(c_4 u_1^2 + c_5 u_1 u_2 + c_6 u_1 u_3 + c_7 u_2^2 + c_8 u_2 u_3 + c_9 u_3^2)$$
$$= A_4 c_4 + A_5 c_5 + A_6 c_6 + A_7 c_7 + A_8 c_8 + A_9 c_9,$$

and the eddy current interference magnetic field $H_{EDDY}(t)$ satisfies:

$$H_{EDDY}(t) = H_e \begin{pmatrix} c_{10} u_1 u_1' + c_{11} u_1 u_2' + c_{12} u_1 u_3' + c_{13} u_2 u_1' + \\ c_{14} u_2 u_2' + c_{15} u_2 u_3' + c_{16} u_3 u_1' + c_{17} u_3 u_2' + c_{18} u_3 u_3' \end{pmatrix}$$
$$= \begin{array}{c} A_{10} c_{10} + A_{11} c_{11} + A_{12} c_{12} + A_{13} c_{13} + A_{14} c_{14} + \\ A_{15} c_{15} + A_{16} c_{16} + A_{17} c_{17} + A_{18} c_{18}, \end{array}$$

wherein $c_i, i=1, \ldots, 3$ is a compensation coefficient of the constant interference magnetic field; $A_i, i=1, \ldots, 3$ is an attitude term constituted by direction cosines; $H_e(t)$ is strength of a geomagnetic field, $c_i, i=4, \ldots, 9$ is a compensation coefficient of the induced interference magnetic field; $A_i, i=4, \ldots, 9$ is an attitude term constituted by corresponding direction cosines and $H_e(t)$; $u'_1$, $u'_2$ and $u'_3$ are derivatives of $u_1$, $u_2$ and $u_3$ with respect to time; $c_i, i=10, \ldots, 18$ is a compensation coefficient of the constant interference magnetic field; $A_i, i=10, \ldots, 18$ is an attitude term constituted by corresponding direction cosines and $H_e(t)$; and $u_1$, $u_2$ and $u_3$ are cosine values of angles between a geomagnetic field vector and positive direction of three directional axes of an aircraft carrier coordinate system, that is, the direction cosines.

In some embodiments of the present disclosure, the direction cosines $u_1$, $u_2$ and $u_3$ satisfy:

$$u_1 = \cos X(t) = T(t)/\sqrt{T(t)^2 + L(t)^2 + V(t)^2}$$

$$u_2 = \cos Y(t) = L(t)/\sqrt{T(t)^2 + L(t)^2 + V(t)^2}$$

$$u_3 = \cos Z(t) = V(t)/\sqrt{T(t)^2 + L(t)^2 + V(t)^2}$$

wherein $T(t)$, $L(t)$ and $V(t)$ are the outputs of the three-axis fluxgate magnetometer in three directions.

In some embodiments of the present disclosure, determining, according to the upper limit of the error of the magnetic noise, whether the environmental background field and the aeromagnetic flight platform are suitable for an aeromagnetic survey flight comprises: determining whether the environmental background field and the aeromagnetic flight platform satisfy an aeromagnetic experiment, according to whether a calculated aeromagnetic compensation upper limit is less than a lower limit of accuracy for the aeromagnetic experiment, and if the aeromagnetic compensation upper limit is less than the lower limit of the accuracy for the aeromagnetic experiment, determining that it is suitable for the aeromagnetic survey flight; otherwise, determining that it is not suitable for the aeromagnetic survey flight.

In some embodiments of the present disclosure, performing a calibration flight to acquire a compensation coefficient comprises: performing the calibration flight and acquiring an attitude term according to outputs of a three-axis fluxgate magnetometer in three directions and strength of a geomagnetic field; acquiring an interference magnetic field of an aircraft at an optically pumped magnetometer according to data of the calibration flight; and calculating the compensation coefficient using the attitude term and the interference magnetic field, wherein the compensation coefficient satisfies:

$$C = (A^T A)^{-1} A^T H_d$$

wherein C is a column vector constituted by the compensation coefficient; A is a matrix constituted by discrete time series of the attitude term; $H_d$ is a column vector constituted by discrete time series of $H_d(t)$; and $H_d(t)$ is strength of an interference magnetic field of the aircraft at time t.

In some embodiments of the present disclosure, the interference magnetic field of the aircraft at the optically pumped magnetometer satisfies:

$$H_d(t) = H_{PERM}(t) + H_{IND}(t) + H_{EDDY}(t)$$

wherein $H_d(t)$ the interference magnetic field of the aircraft at the optically pumped magnetometer; $H_{PERM}(t)$ is a constant interference magnetic field; $H_{EDDY}(t)$ is an induced interference magnetic field; and $H_{EDDY}(t)$ is an eddy current interference magnetic field; and the interference magnetic field comprises 18 items or some of the 18 items.

In some embodiments of the present disclosure, a magnetic field after the magnetic compensation is performed satisfies:

$$H_C = H_M - A_M C$$

wherein $H_C$ is the magnetic field after the magnetic compensation is performed; $H_M$ is data measured by the optically pumped magnetometer; and $A_M$ is an attitude term acquired during the actual flight, and is calculated according to measured data of a fluxgate.

In some embodiments of the present disclosure, acquiring the upper limit of the error of the magnetic noise caused by the environmental background field in the exploration area comprises: measuring the environmental background magnetic field at a certain point in the area to be explored in a state without an exploration aircraft, and acquiring the upper limit of the error of the magnetic noise caused by the environmental background field, by using the aeromagnetic compensation error model; and acquiring the upper limit of the error of the magnetic noise caused by the aeromagnetic flight platform comprises: measuring a magnetic field of the noise in an operation state, wherein, in the operation state, devices such as engines and avionics of an aircraft are turned on during an exploration operation, and acquiring the upper limit of the error of the magnetic noise caused by the aeromagnetic flight platform, by using the aeromagnetic compensation error model.

DETAILED DESCRIPTION

The conventional aeromagnetic compensation model may not be used to determine an upper limit of compensation of its own, and may not predict in advance whether an environmental background field in an area to be explored satisfies requirements of aeromagnetic exploration. In addition, in the existing aeromagnetic compensation models, there is no way to select a theoretical determination method suitable for a flight platform, and it may not be predicted whether magnetic characteristics of the flight platform satisfy the requirements of aeromagnetic exploration before an aeromagnetic calibration flight is performed, and therefore, it may cause an invalid flight to be performed in an actual aeromagnetic operation.

The present disclosure provides a magnetic compensation method for performance quality assessment by using an aeromagnetic compensation error model. Before an aeromagnetic compensation flight is performed, a model error caused by an environmental background magnetic noise, engines of an aircraft and avionics is firstly calculated to determine an upper limit of a background error, so as to determine whether a magnetic noise level in an area or of the aircraft is suitable for an aeromagnetic survey flight. There is provided a method for calculating an upper limit of magnetic compensation, which may estimate an environmental background field in an exploration area before an aeromagnetic compensation calibration flight is performed, and magnetic characteristics of an aeromagnetic exploration platform are estimated effectively in advance, to determine in advance whether the exploration area and an aeromagnetic flight platform are suitable for an aeromagnetic exploration, which provides a theoretical basis for the selection and construction of the platform, and avoids occurrence of an invalid flight.

In order to make the purposes, technical solutions, and advantages of the present disclosure more clear, the present disclosure will be further described in detail below in combination with specific embodiments and with reference to accompanying drawings.

In a first exemplary embodiment of the present disclosure, there is provided a magnetic compensation method for performance quality assessment by using an aeromagnetic compensation error model.

Figure 1:
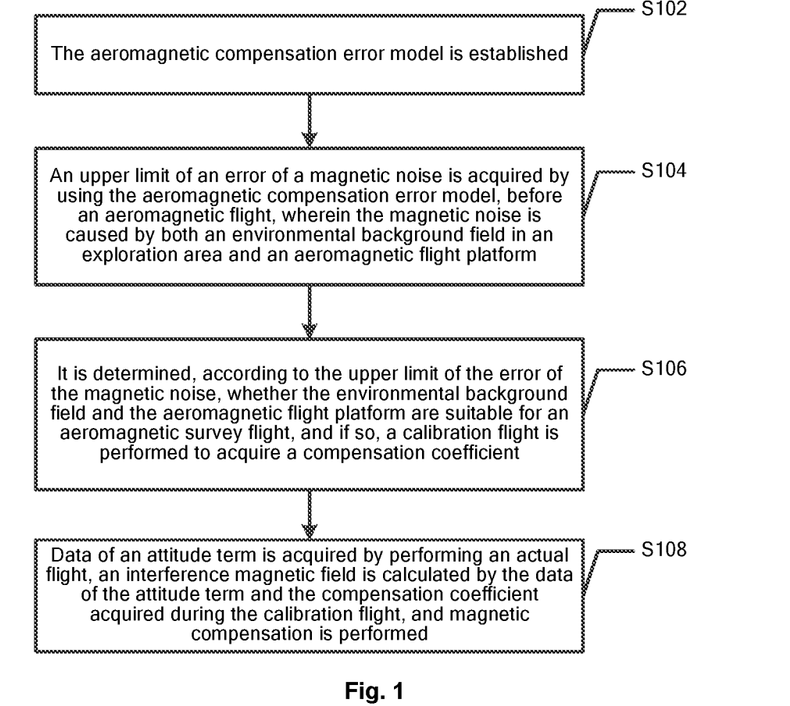
FIG. 1 is a flowchart of a magnetic compensation method based on an aeromagnetic compensation error model according to an embodiment of the present disclosure.
Figure 2:
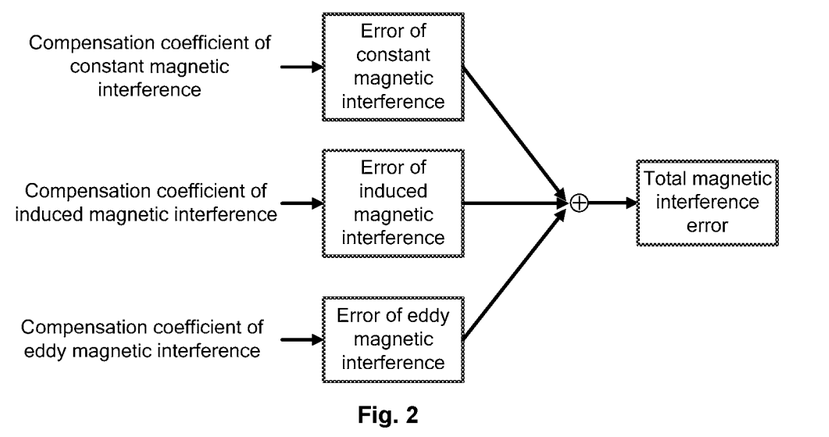
FIG. 2 is a calculation block diagram of an aeromagnetic compensation error model according to an embodiment of the present disclosure.

FIG. 1 is a flowchart of a magnetic compensation method based on an aeromagnetic compensation error model according to an embodiment of the present disclosure. FIG. 2 is a calculation block diagram of an aeromagnetic compensation error model according to an embodiment of the present disclosure.

As shown in FIGS. 1 and 2, the magnetic compensation method based on an aeromagnetic compensation error model according to the present disclosure comprises the following steps.

In step S102, the aeromagnetic compensation error model is established.

As shown in FIG. 2, in this step, establishing an aeromagnetic compensation error model comprises: acquiring various interference magnetic fields, and acquiring errors of magnetic interferences corresponding to the interference magnetic fields based on expressions of the respective interference magnetic fields, to acquire a total magnetic interference error, so as to establish the aeromagnetic compensation error model.

In the conventional aeromagnetic exploration process, various interference magnetic fields are mainly divided into three types of interference magnetic fields, comprising: a constant interference magnetic field, an induced interference magnetic field and an eddy current interference magnetic field. Therefore, for the three types of interference magnetic fields, magnetic interference errors corresponding to the interference magnetic fields are derived and comprise: an error of a constant magnetic interference, an error of an induced magnetic interference and an error of an eddy current magnetic interference, so as to obtain a total magnetic interference error.

Expressions of the constant interference magnetic field, the induced interference magnetic field and the eddy current interference magnetic field in aeromagnetic flight data will be described below, and the corresponding errors and the total error are derived accordingly.

Firstly, an attitude of an aircraft is measured by establishing a relationship between outputs of a three-axis fluxgate magnetometer and direction cosines of a geomagnetic field vector in an aircraft carrier coordinate system. The relationship therebetween may be expressed as:

$$u_1 = \cos X(t) = T(t)/\sqrt{T(t)^2 + L(t)^2 + V(t)^2}$$

$$u_2 = \cos Y(t) = L(t)/\sqrt{T(t)^2 + L(t)^2 + V(t)^2}$$

$$u_3 = \cos Z(t) = V(t)/\sqrt{T(t)^2 + L(t)^2 + V(t)^2} \quad (1)$$

wherein $u_1$, $u_2$ and $u_3$ are cosine values of angles between the geomagnetic field vector and positive direction of three directional axes of the aircraft carrier coordinate system; and $T(t)$, $L(t)$ and $V(t)$ are the outputs of the three-axis fluxgate magnetometer in three directions.

An interference magnetic field generated by the aircraft at an optically pumped magnetometer is composed of the constant interference magnetic field, the induced interference magnetic field, and the eddy current interference magnetic field. The interference magnetic field of the aircraft at the optically pumped magnetometer is expressed as:

$$H_d(t) = H_{PERM}(t) + H_{IND}(t) + H_{EDDY}(t) \quad (2)$$

$$= \sum_{i=1}^{18} A_i c_i$$

A corresponding matrix expression is expressed as:

$$H_d = AC + z \quad (3)$$

$$H_d = [H_d(1) \ H_d(2) \ \ldots \ H_d(n)]^T \quad (4)$$

$$C = [c_1 \ c_2 \ \ldots \ c_{18}]^T \quad (5)$$

$$A = \begin{bmatrix} A_1(1) & A_2(1) & \ldots & A_{18}(1) \\ A_1(2) & A_2(2) & \ldots & A_{18}(2) \\ \vdots & \vdots & \ddots & \ldots \\ A_1(n) & A_2(n) & \ldots & A_{18}(n) \end{bmatrix} \quad (6)$$

$$z = [z(1) \ z(2) \ \ldots \ z(n)]^T \quad (7)$$

wherein $H_d(t)$ is strength of an interference magnetic field of the aircraft at time t; $H_{PERM}(t)$ is the constant interference magnetic field; $H_{IND}(t)$ is the induced interference magnetic field; $H_{EDDY}(t)$ is the eddy current interference magnetic field; $A_i, i=10, \ldots, 18$ is an attitude term; $c_i, i=10, \ldots, 18$ is a compensation coefficient; $H_d$ is a column vector constituted by discrete time series of $H_d(t)$; $C$ is a column vector constituted by the compensation coefficient; $A$ is a matrix constituted by discrete time series of the attitude term; $z$ is an observation noise; $H_d(n)$ is strength of an interference magnetic field of the aircraft at time n; and $z(n)$ is an observation noise at time n.

In this implementation, the observation noise is a Gaussian white noise with a mean of 0.

wherein the constant interference magnetic field is expressed as follows:

$$H_{PERM}(t) = c_1 u_1 + c_2 u_2 + c_3 u_3 \qquad (8)$$
$$= A_1 c_1 + A_2 c_2 + A_3 c_3$$

wherein $c_i, i=1, \ldots, 3$ is a compensation coefficient of the constant interference magnetic field; and $A_i, i=1, \ldots, 3$ is an attitude term constituted by direction cosines.

The induced interference magnetic field is expressed as follows:

$$H_{IND}(t) = H_e(t) \begin{pmatrix} c_4 u_1^2 + c_5 u_1 u_2 + c_6 u_1 u_3 + \\ c_7 u_2^2 + c_8 u_2 u_3 + c_9 u_3^2 \end{pmatrix} \qquad (9)$$
$$= A_4 c_4 + A_5 c_5 + A_6 c_6 + A_7 c_7 + A_8 c_8 + A_9 c_9$$

wherein $H_e(t)$ is strength of a geomagnetic field, $c_i, i=4, \ldots, 9$ is a compensation coefficient of the induced interference magnetic field; and $A_i, i=4, \ldots, 9$ is an attitude term constituted by corresponding direction cosines and $H_e(t)$.

The eddy current interference magnetic field is expressed as follows:

$$H_{EDDY}(t) = H_e \begin{pmatrix} c_{10} u_1 u_1' + c_{11} u_1 u_2' + c_{12} u_1 u_3' + c_{13} u_2 u_1' + \\ c_{14} u_2 u_2' + c_{15} u_2 u_3' + c_{16} u_3 u_1' + c_{17} u_3 u_2' + \\ c_{18} u_3 u_3' \end{pmatrix} \qquad (10)$$
$$= A_{10} c_{10} + A_{11} c_{11} + A_{12} c_{12} + A_{13} c_{13} + A_{14} c_{14} +$$
$$A_{15} c_{15} + A_{16} c_{16} + A_{17} c_{17} + A_{18} c_{18}$$

wherein $u'_1$, $u'_2$ and $u'_3$ are derivatives of $u_1$, $u_2$ and $u_3$ with respect to time; $c_i, i=10, \ldots, 18$ is a compensation coefficient of the constant interference magnetic field; and $A_i, i=10, \ldots, 18$ is an attitude term constituted by corresponding direction cosines and $H_e(t)$.

Secondly, the corresponding errors and the total error are derived based on the expressions of the constant interference magnetic field, the induced interference magnetic field and the eddy current interference magnetic field.

The error of the constant magnetic interference may be obtained according to the expression of the constant interference magnetic field as shown in formula (8) in combination with a measurement relationship of the attitude of the aircraft as shown in formula (1), and is expressed as follows:

$$error_P = \frac{\partial H_{PERM}}{\partial T} \Delta T + \frac{\partial H_{PERM}}{\partial L} \Delta L + \frac{\partial H_{PERM}}{\partial V} \Delta V \qquad (11)$$

wherein $\Delta T$, $\Delta V$ and $\Delta L$ are error levels of measured values of the fluxgate in three directions respectively.

Partial derivatives of the constant interference magnetic field with respect to the measured values in the three directions satisfy the following relationship:

$$\frac{\partial H_{PERM}}{\partial T} = c_1 \frac{L^2 + V^2}{H_e^3} - c_2 \frac{LT}{H_e^3} - c_3 \frac{VT}{H_e^3} \qquad (12)$$

$$\frac{\partial H_{PERM}}{\partial L} = c_2 \frac{T^2 + V^2}{H_e^3} - c_1 \frac{LT}{H_e^3} - c_3 \frac{VL}{H_e^3} \qquad (13)$$

$$\frac{\partial H_{PERM}}{\partial V} = c_3 \frac{L^2 + T^2}{H_e^3} - c_2 \frac{LV}{H_e^3} - c_1 \frac{VT}{H_e^3} \qquad (14)$$

The error of the induced magnetic interference may be obtained according to the expression of the induced interference magnetic field as shown in formula (9) in combination with the measurement relationship of the attitude of the aircraft as shown in formula (1), and is expressed as follows:

$$error_I = \frac{\partial H_{IND}}{\partial T} \Delta T + \frac{\partial H_{IND}}{\partial L} \Delta L + \frac{\partial H_{IND}}{\partial V} \Delta V \qquad (15)$$

Partial derivatives of the induced interference magnetic field with respect to the measured values in the three directions satisfy the following relationship:

$$\frac{\partial H_{IND}}{\partial T} = c_4 \frac{T^3 + 2TL^2 + 2TV^2}{H_e^3} + c_5 \frac{L^3 + V^2 L}{H_e^3} + \qquad (16)$$
$$c_6 \frac{V^3 + L^2 V}{H_e^3} - c_7 \frac{TL^2}{H_e^3} - c_8 \frac{LVT}{H_e^3} - c_9 \frac{V^2 T}{H_e^3}$$

$$\frac{\partial H_{IND}}{\partial L} = c_7 \frac{L^3 + 2LT^2 + 2LV^2}{H_e^3} + c_5 \frac{T^3 + V^2 T}{H_e^3} + \qquad (17)$$
$$c_8 \frac{V^3 + T^2 V}{H_e^3} - c_4 \frac{LT^2}{H_e^3} - c_6 \frac{LVT}{H_e^3} - c_9 \frac{V^2 L}{H_e^3}$$

$$\frac{\partial H_{IND}}{\partial V} = c_9 \frac{V^3 + 2VL^2 + 2VT^2}{H_e^3} + c_8 \frac{L^3 + T^2 L}{H_e^3} + \qquad (18)$$
$$c_6 \frac{T^3 + L^2 T}{H_e^3} - c_7 \frac{VL^2}{H_e^3} - c_5 \frac{LVT}{H_e^3} - c_4 \frac{T^2 V}{H_e^3}$$

The error of the eddy current magnetic interference may be obtained according to the expression of the eddy current interference magnetic field as shown in formula (10) in combination with the measurement relationship of the attitude of the aircraft as shown in formula (1), and is expressed as follows:

$$error_E = \frac{\partial H_{EDDY}}{\partial T} \Delta T + \frac{\partial H_{EDDY}}{\partial L} \Delta L + \frac{\partial H_{EDDY}}{\partial V} \Delta V \qquad (19)$$

Partial derivatives of the eddy current interference magnetic field with respect to the measured values in the three directions satisfy the following relationship:

$$\frac{\partial H_{EDDY}}{\partial T} = c_{10}\left(\left(\frac{T}{H_e}\right)' + T\left(\frac{L^2 + V^2}{H_e^3}\right)'\right) + c_{11}\left(\left(\frac{L}{H_e}\right)' - T\left(\frac{TL}{H_e^3}\right)'\right) + \qquad (20)$$
$$c_{12}\left(\left(\frac{V}{H_e}\right)' - T\left(\frac{TV}{H_e^3}\right)'\right) + c_{13}L\left(\frac{L^2 + V^2}{H_e^3}\right)' - c_{14}L\left(\frac{TL}{H_e^3}\right)' -$$
$$c_{15}L\left(\frac{TV}{H_e^3}\right)' + c_{16}V\left(\frac{L^2 + V^2}{H_e^3}\right)' - c_{17}V\left(\frac{TL}{H_e^3}\right)' - c_{18}V\left(\frac{TV}{H_e^3}\right)'$$

-continued $$\frac{\partial H_{EDDY}}{\partial L} = c_{14}\left(\left(\frac{L}{H_e}\right)' + L\left(\frac{T^2+V^2}{H_e^3}\right)'\right) + c_{13}\left(\left(\frac{T}{H_e}\right)' - L\left(\frac{TL}{H_e^3}\right)'\right) + \quad (21)$$

$$c_{15}\left(\left(\frac{V}{H_e}\right)' - L\left(\frac{LV}{H_e^3}\right)'\right) + c_{11}T\left(\frac{T^2+V^2}{H_e^3}\right)' - c_{10}T\left(\frac{TL}{H_e^3}\right)' -$$

$$c_{12}T\left(\frac{LV}{H_e^3}\right)' + c_{17}V\left(\frac{T^2+V^2}{H_e^3}\right)' - c_{16}V\left(\frac{TL}{H_e^3}\right)' - c_{18}V\left(\frac{LV}{H_e^3}\right)'$$

$$\frac{\partial H_{EDDY}}{\partial V} = c_{18}\left(\left(\frac{V}{H_e}\right)' + V\left(\frac{L^2+T^2}{H_e^3}\right)'\right) + c_{17}\left(\left(\frac{L}{H_e}\right)' - V\left(\frac{VL}{H_e^3}\right)'\right) + \quad (22)$$

$$c_{16}\left(\left(\frac{T}{H_e}\right)' - V\left(\frac{TV}{H_e^3}\right)'\right) + c_{15}L\left(\frac{L^2+T^2}{H_e^3}\right)' - c_{14}L\left(\frac{VL}{H_e^3}\right)' -$$

$$c_{13}L\left(\frac{TV}{H_e^3}\right)' + c_{12}T\left(\frac{L^2+T^2}{H_e^3}\right)' - c_{11}T\left(\frac{VL}{H_e^3}\right)' - c_{10}T\left(\frac{TV}{H_e^3}\right)'$$

According to the obtained error of the constant magnetic interference, the obtained error of the induced magnetic interference and the obtained error of the eddy current magnetic interference, the total magnetic interference error is obtained, which is the aeromagnetic compensation error model. Here, the total magnetic interference error satisfies:

$$\text{Error}_T = \text{error}_P + \text{error}_I + \text{error}_E \quad (23)$$

$\Delta T$, $\Delta V$ and $\Delta L$ are obtained using the measured values of the attitude of the aircraft, and the aeromagnetic compensation error model may be obtained according to the formula (23).

In step S104, an upper limit of an error of a magnetic noise is acquired by using the aeromagnetic compensation error model, before an aeromagnetic flight, wherein the magnetic noise is caused by both an environmental background field in an exploration area and an aeromagnetic flight platform.

Firstly, the error caused by the magnetic noise existing in the environmental background field in the exploration area is acquired. In a state where there is no exploration aircraft, the environmental background magnetic field is measured at a certain point in the area to be explored, and the error of the magnetic noise caused by the environmental background field is acquired by using the aeromagnetic compensation error model.

In this embodiment, an experimental scene is as follows: an open field in the wild is selected as a measurement area, an optically pumped magnetometer and a fluxgate magnetometer are fixed on an extension rod made of a non-magnetic material, the extension rod is fixed to a wooden stand bracket which is located at a certain point in the measurement area, and it is ensured that there is no uncontrollable magnetic noise source such as motor automobiles in a surrounding environment, to ensure that the measured data is a magnetic noise only caused by an environmental background field.

A process of processing experimental data comprises: processing test results of the fluxgate magnetometer to obtain error levels of the measured values of the fluxgate in three directions, and obtaining errors of the magnetic noise caused by the environmental background field based on expressions of respective components in the aeromagnetic compensation error model.

Figure 3:
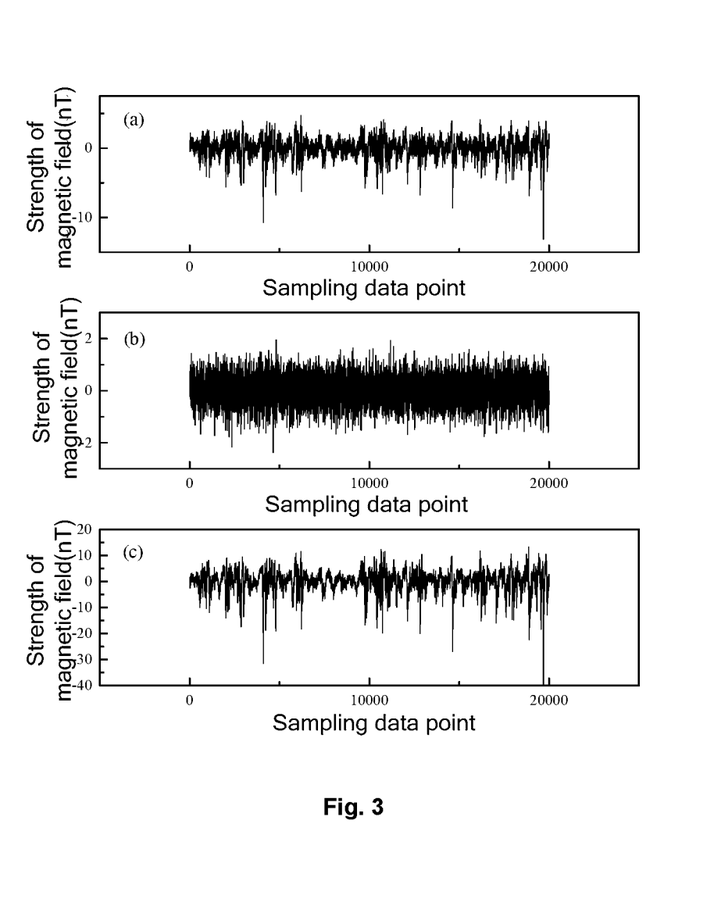
FIG. 3 is a diagram of output results of three channels of a fluxgate under a background field in a measurement area according to an embodiment of the present disclosure.
Figure 4:
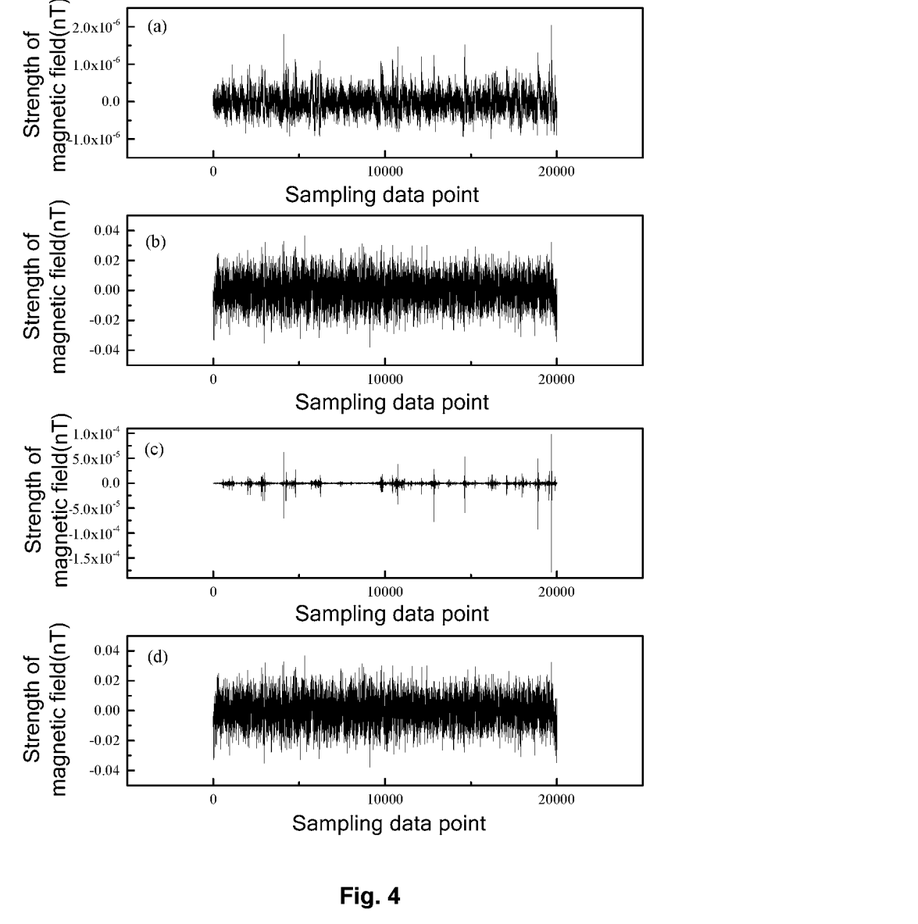
FIG. 4 is error curves of three types of magnetic interference and a total magnetic interference under a background field in a measurement area according to an embodiment of the present disclosure.

FIG. 3 is a diagram of output results of three channels of a fluxgate under a background field in a measurement area according to an embodiment of the present disclosure. FIG. 4 is error curves of three types of magnetic interference and a total magnetic interference under a background field in a measurement area according to an embodiment of the present disclosure.

In the present embodiment, data of a fluxgate magnetometer in three directions is processed by a high-pass filter of 0.065 Hz to obtain errors $\Delta T$, $\Delta V$ and $\Delta L$ of measured values of the fluxgate in the three directions, and results of $\Delta T$, $\Delta V$ and $\Delta L$ from which direct current components are removed are shown in (a), (b) and (c) in FIG. 3 respectively. Error curves of three types of magnetic interference and a total magnetic interference under a background field in a measurement area, shown in FIG. 4, are obtained according to the formulas (23), (11), (15) and (19), wherein (a) is the error curve of the constant magnetic interference, (b) is the error curve of the induced magnetic interference, (c) is the error curve of the eddy current magnetic interference, and (d) is the error curve of the total magnetic interference.

Table 1 shows standard deviations and Figure Of Merit (FOM) values of the three types of magnetic interference fields and the total magnetic interference field under the environmental background field, and standard deviations and FOMs of different magnetic interference fields are calculated from the curves shown in FIG. 4 and are shown in Table 1.

TABLE 1

Standard deviations and FOMs of different magnetic interference fields in environmental background field

| Type | Standard deviation (nT) | FOM (nT) |
| --- | --- | --- |
| Constant magnetic interference | $2.85 \times 10^{-7}$ | $3.04 \times 10^{-6}$ |
| Induced magnetic interference | $8.80 \times 10^{-3}$ | $7.45 \times 10^{-2}$ |
| Eddy current magnetic interference | $3.73 \times 10^{-6}$ | $2.78 \times 10^{-4}$ |
| Total magnetic interference field | $8.80 \times 10^{-3}$ | $7.45 \times 10^{-2}$ |

It may be known from Table 1 that when an aeromagnetic exploration experiment is carried out in this measurement area, no matter what kind of aircraft is used as a magnetic measurement platform, an upper limit of aeromagnetic compensation which may be achieved is $7.45 \times 10^{-2}$ nT. Thus, this area has a good background magnetic environment, and is suitable for a high-accuracy aeromagnetic operation.

Secondly, the error caused by the magnetic noise existing in an aeromagnetic flight platform is acquired. In the aeromagnetic flight platform, main sources of errors in magnetic noises are engines of an aircraft and avionics. Therefore, during an exploration operation, the engines of the aircraft and the avionics are in a turn-on state, a noise magnetic field in this operation state is measured, and an error in a magnetic noise caused by the aeromagnetic flight platform is acquired by using the aeromagnetic compensation error model.

Since the magnetic noises of the engines of the aircraft and the avionics are generated in a similar principle to that of magnetic noises of engines of automobiles and on-board electronic devices to a certain extent, in the present embodiment, an automobile is used to simulate the magnetic noise generated by the aircraft and measurement is made by way of experimental simulation in the wild.

In this embodiment, an experimental scene is as follows: an open field in the wild is selected as a measurement area, an optically pumped magnetometer and a fluxgate magnetometer are fixed on an extension rod made of a non-magnetic material, the extension rod is fixed to a wooden stand bracket which is located at a certain point in the measurement area, a modern SUV is used to simulate an aircraft platform and is at an idle speed during the experiment, and on-board electronic devices are in a turn-on state.

Magnetic noises in the experimental data obtained in this experimental scene comprise an error of a magnetic noise caused by an environmental background field and an error of magnetic noises caused by engines of the automobile and the on-board electronic devices.

Figure 5:
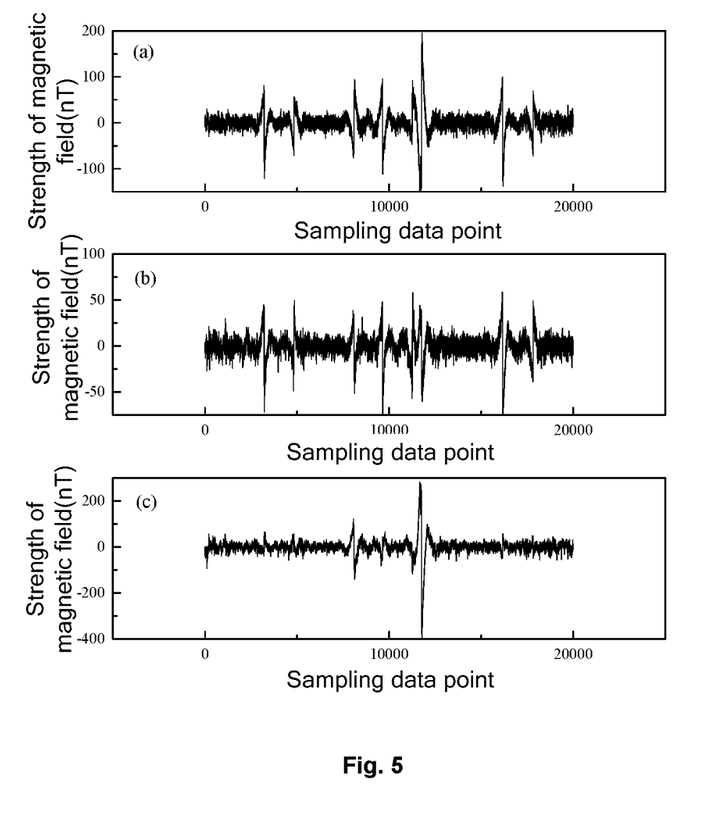
FIG. 5 is a diagram of output results of three channels of a fluxgate in an experiment using an automobile to simulate magnetic noises of engines of an aircraft and avionics according to an embodiment of the present disclosure.
Figure 6:
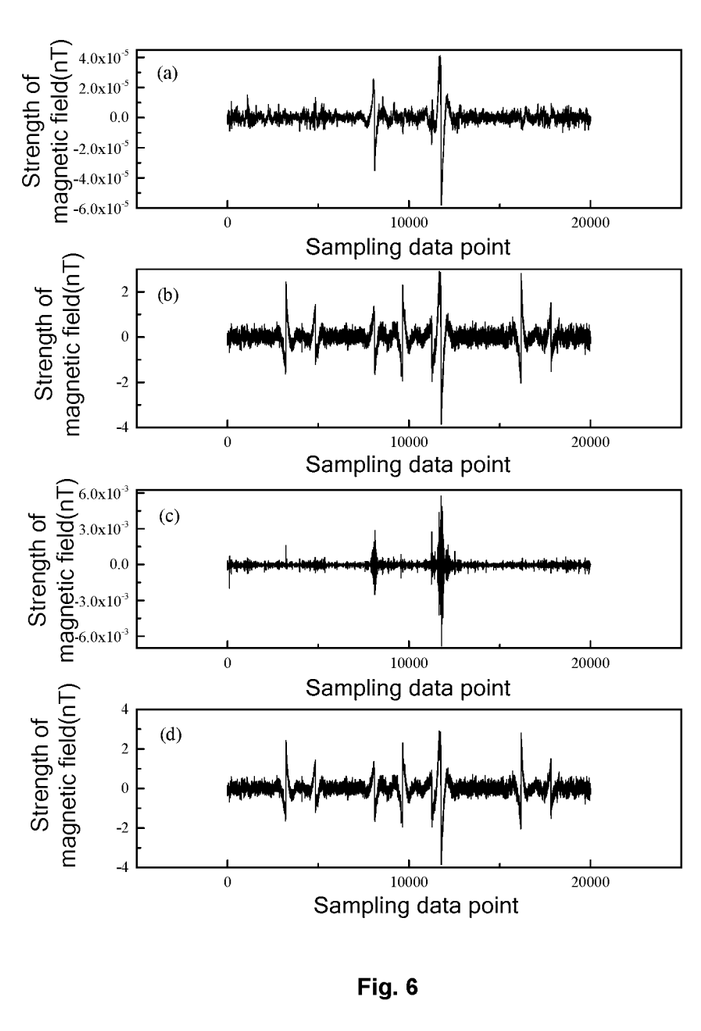
FIG. 6 is error curves of three types of magnetic interference and a total magnetic interference in an experiment using an automobile to simulate magnetic noises of engines of an aircraft and avionics according to an embodiment of the present disclosure.

FIG. 5 is a diagram of output results of three channels of a fluxgate in an experiment using an automobile to simulate magnetic noises of engines of an aircraft and avionics according to an embodiment of the present disclosure. FIG. 6 is error curves of three types of magnetic interference and a total magnetic interference in an experiment using an automobile to simulate magnetic noises of engines of an aircraft and avionics according to an embodiment of the present disclosure.

Data of a fluxgate magnetometer in three directions is processed according to a method of acquiring a magnetic noise existing in an environmental background field to obtain errors $\Delta T$, $\Delta V$ and $\Delta L$ of measured values of the fluxgate in the three directions, and results of $\Delta T$, $\Delta V$ and $\Delta L$ from which direct current components are removed are shown in (a), (b) and (c) in FIG. 5 respectively. Error curves of three types of magnetic interference and a total magnetic interference caused by an aeromagnetic flight platform and a background field in an observation area during an exploration process are obtained according to the formulas (23), (11), (15) and (19) and are shown in FIG. 6, wherein (a) is the error curve of the constant magnetic interference, (b) is the error curve of the induced magnetic interference, (c) is the error curve of the eddy current magnetic interference, and (d) is the error curve of the total magnetic interference.

It may be seen from FIG. 5 that there is a step-like fluctuation in the measured signal. The fluctuation signal is mainly caused by automatic gear shifting of a gearbox of a SUV, and belongs to a sudden signal.

Table 2 shows standard deviations and FOM values of the three types of magnetic interference fields and the total magnetic interference field in an exploration mode, and standard deviations and FOMs of different magnetic interference fields are calculated from the curves shown in FIG. 6 and are shown in Table 2.

TABLE 2

Standard deviations and FOMs of different magnetic interference fields in the exploration mode

| Type | Standard deviation (nT) | FOM (nT) |
|---|---|---|
| Constant magnetic interference | $5.66 \times 10^{-6}$ | $9.92 \times 10^{-5}$ |
| Induced magnetic interference | 0.49 | 6.76 |
| Eddy current magnetic interference | $2.83 \times 10^{-4}$ | $1.26 \times 10^{-2}$ |
| Total magnetic interference field | 0.49 | 6.76 |

It may be seen by comparing Table 2 with Table 1 that in the environmental background field, an theoretical upper limit of compensation which may be achieved by the aeromagnetic compensation model is ideal, and is only $7.45 \times 10^{-2}$ nT. In the exploration mode, a total upper limit is 6.76 nT, which indicates that the magnetic noises caused by the engines of the aircraft and the avionics may worsen the effect of aeromagnetic compensation. Further, according to the upper limit of the magnetic compensation, it is possible to determine whether a magnetic noise level in the area or of the aircraft is suitable for an aeromagnetic survey flight.

It should be illustrated that the compensation coefficients in the formulas (11), (15) and (19) are real test data obtained from a certain aeromagnetic calibration flight, and then the results shown in Tables 1 and 2 are calculated.

The compensation coefficients used in the above experiments are listed in Table 3 below.

TABLE 3

Aeromagnetic compensation coefficients obtained during a calibration flight

| $c_1$ | $c_2$ | $c_3$ | $c_4$ | $c_5$ | $c_6$ |
|---|---|---|---|---|---|
| $1.18 \times 10^{-2}$ | $1.83 \times 10^{-2}$ | $4.70 \times 10^{-4}$ | $1.72 \times 10^{-2}$ | $-1.20 \times 10^{-5}$ | $-2.55 \times 10^{-5}$ |
| $c_7$ | $c_8$ | $c_9$ | $c_{10}$ | $c_{11}$ | $c_{12}$ |
| $1.68 \times 10^{-2}$ | $3.19 \times 10^{-5}$ | $1.62 \times 10^{-2}$ | $4.5 \times 10^{-3}$ | $1.1 \times 10^{-3}$ | $2.76 \times 10^{-4}$ |
| $c_{13}$ | $c_{14}$ | $c_{15}$ | $c_{16}$ | $c_{17}$ | $c_{18}$ |
| $1.64 \times 10^{-4}$ | $5.1 \times 10^{-3}$ | $8.28 \times 10^{-4}$ | $-3.14 \times 10^{-5}$ | $-5.04 \times 10^{-4}$ | $4.3 \times 10^{-3}$ |

In step S106, it is determined, according to the upper limit of the error of the magnetic noise, whether the environmental background field and the aeromagnetic flight platform are suitable for an aeromagnetic survey flight, and if so, a calibration flight is performed to acquire a compensation coefficient.

Different types of aeromagnetic experiments have different accuracy requirements. According to whether the calculated upper limit of the aeromagnetic compensation is less than a lower limit of accuracy of the aeromagnetic experiments, it is determined whether the environmental background field and the flight platform satisfy the aeromagnetic experiments. Specifically, high-accuracy aeromagnetic experiments usually require a FOM to be less than 1 nT. If the calculated upper limit of the aeromagnetic compensation is greater than 1 nT, it proves that an area or an aircraft in flight is not suitable for aeromagnetic experiments under this accuracy.

According to the above upper limit of the error, it is determined whether the environmental background field and the aeromagnetic flight platform are suitable for an aeromagnetic survey flight, and if so, a calibration flight is performed and then compensation coefficients are obtained. A least square solution of the compensation coefficients in the formula (3) is expressed as the following expression:

$$C=(A^TA)^{-1}A^TH_d \quad (24)$$

The method for acquiring the compensation coefficients comprises: performing a calibration flight, and acquiring an attitude term according to outputs of the three-axis fluxgate magnetometer in three directions and strength of a geomagnetic field; acquiring an interference magnetic field of the aircraft at the optically pumped magnetometer according to data of the calibration flight; and calculating the compensation coefficients using the attitude term and the interference magnetic field.

In the present embodiment, the attitude term in the formula (24) is obtained by using the outputs of the three-axis fluxgate magnetometer in the three directions and the strength of the geomagnetic field, and $H_d$ is magnetic interference data which is derived through the curves obtained by the optically pumped magnetometer during the calibration flight.

In step S108, data of an attitude term is acquired by performing an actual flight, an interference magnetic field is calculated by the data of the attitude term and the compensation coefficient acquired during the calibration flight, and magnetic compensation is performed.

In an actual flight process, attitude information of the aircraft with respect to the geomagnetic field is measured by using the three-axis magnetometer. It may be known from the formulas (8) to (10) that the corresponding attitude term may be determined according to the direction cosines and the geomagnetic field, and therefore corresponding 18 attitude terms may be obtained by the outputs of the three-axis magnetometer and the value of the geomagnetic field, and then the interference magnetic field of the aircraft is obtained by using the 18 attitude terms and the compensation coefficients obtained during the calibration flight.

A magnetic field after magnetic compensation is performed satisfies the following expression:

$$H_C = H_M - A_M C \quad (25)$$

wherein $H_C$ is the magnetic field after the magnetic compensation is performed; $H_M$ is data measured by the optically pumped magnetometer; and $A_M$ is an attitude term acquired during an exploration flight, and is calculated according to measured data of a fluxgate.

Since the optically pumped magnetometer has much higher sensitivity than the fluxgate, the upper limit of the aeromagnetic compensation in the formula (25) is determined by a contribution component $A_M C$ of the fluxgate.

It should be emphasized that the magnetic compensation method based on an aeromagnetic compensation error model according to the present disclosure is not limited to the specific methods mentioned in the embodiments, and those skilled in the art may simply make changes or substitutions thereto, for example:

the aeromagnetic compensation model does not necessarily comprise all 18 items as selected items to be used, and may only cover some of the 18 items.

In summary, the present disclosure provides a magnetic compensation method for performance quality assessment by using an aeromagnetic compensation error model. Before an aeromagnetic compensation flight is performed, a model error caused by an environmental background magnetic noise, engines of an aircraft and avionics is firstly calculated to determine an upper limit of a background error, so as to determine whether a magnetic noise level in an area or of the aircraft is suitable for an aeromagnetic survey flight. There is provided a method for calculating an upper limit of magnetic compensation, which may estimate an environmental background field in an exploration area before an aeromagnetic compensation calibration flight is performed, and magnetic characteristics of an aeromagnetic flight platform are estimated effectively in advance, to determine in advance whether the exploration area and an aeromagnetic flight platform are suitable for aeromagnetic exploration, which provides a theoretical basis for the selection and construction of the platform, and avoids occurrence of an invalid flight.

Of course, according to actual needs, the magnetic compensation method based on an aeromagnetic compensation error model according to the present disclosure further comprises other commonly-used methods and steps. Since the other commonly-used methods and steps have nothing to do with the innovation of the present disclosure, they will not be repeated here.

The specific embodiments described above further describe the purposes, technical solutions, and beneficial effects of the present disclosure in detail. It should be understood that the above description is only specific embodiments of the present disclosure and is not intended to limit the present disclosure. Any modifications, equivalent substitutions, or improvements etc. made within the spirit and principle of the present disclosure, shall be included in the protection scope of the present disclosure.

We claim:

1. A magnetic compensation method based on an aeromagnetic compensation error model, comprising:

acquiring a total magnetic interference error by using the aeromagnetic compensation error model, before an actual flight, wherein the total magnetic interference error is caused by both an environmental background field in an exploration area and an aeromagnetic flight platform;

determining, according to the total magnetic interference error, before the actual flight, whether the environmental background field and the aeromagnetic flight platform are suitable for the actual flight, and if so, performing a calibration flight to acquire a compensation coefficient, wherein the calibration flight is a flight used to calibrate the actual flight; and acquiring data of an attitude term by performing the actual flight, calculating, after the actual flight, an interference magnetic field by the data of the attitude term and the compensation coefficient acquired during the calibration flight, and performing, after the actual flight, magnetic compensation of the interference magnetic field;

wherein the aeromagnetic compensation error model is established by:

acquiring various interference magnetic fields, and acquiring errors of magnetic interferences corresponding to the interference magnetic fields based on expressions of the respective interference magnetic fields, so as to acquire the total magnetic interference error;

wherein performing the calibration flight to acquire the compensation coefficient comprises:

performing the calibration flight and acquiring an attitude term according to outputs of a three-axis fluxgate magnetometer in three directions and strength of a geomagnetic field;

acquiring an interference magnetic field of an aircraft at an optically pumped magnetometer according to data of the calibration flight; and calculating the compensation coefficient using the attitude term and the interference magnetic field, wherein the compensation coefficient satisfies:

$$C = (A^T A)^{-1} A^T H_d$$

wherein C is a column vector constituted by the compensation coefficient A is a matrix constituted by discrete time series of the attitude term; $H_d$ is a column vector constituted by discrete time series of $H_d(t)$; and $H_d(t)$ is strength of an interference magnetic field of the aircraft at time t; and wherein a magnetic field $H_c$, is obtained by performing the magnetic compensation of the interference magnetic field according to:

$$H_C = H_M - A_M C \qquad 5$$

wherein $H_M$ is data measured by the optically pumped magnetometer; and $A_M$ is an attitude term acquired during the actual flight, and is calculated according to measured data of a fluxgate.

2. The magnetic compensation method according to claim 1, wherein the various interference magnetic fields comprise: a constant interference magnetic field, an induced interference magnetic field, and an eddy current interference magnetic field, and the total magnetic interference error in the aeromagnetic compensation error model satisfies:

$$Error_T = error_P + error_I + error_E$$

$$error_P = \frac{\partial H_{PERM}}{\partial T}\Delta T + \frac{\partial H_{PERM}}{\partial L}\Delta L + \frac{\partial H_{PERM}}{\partial V}\Delta V$$

$$error_I = \frac{\partial H_{IND}}{\partial T}\Delta T + \frac{\partial H_{IND}}{\partial L}\Delta L + \frac{\partial H_{IND}}{\partial V}\Delta V$$

$$error_E = \frac{\partial H_{EDDY}}{\partial T}\Delta T + \frac{\partial H_{EDDY}}{\partial L}\Delta L + \frac{\partial H_{EDDY}}{\partial V}\Delta V$$

wherein $Error_T$, is the total magnetic interference error; $error_P$ is an error of a constant magnetic interference; $error_I$ is an error of an induced magnetic interference; $error_E$ is an error of an eddy current magnetic interference; $H_{PERM}(t)$ is the constant interference magnetic field; $H_{IND}(t)$ is the induced interference magnetic field; $H_{EDDY}(t)$ is the eddy current interference magnetic field; $T(t)$, $L(t)$ and $V(t)$ are outputs of a three-axis fluxgate magnetometer in three directions; and $\Delta T$, $\Delta V$ and $\Delta L$ are error levels of measured values of the fluxgate in three directions respectively.

3. The magnetic compensation method according to claim 2, wherein the constant interference magnetic field $H_{PERM}(t)$ satisfies:

$$H_{PERM}(t) = c_1 u_1 + c_2 u_2 + c_3 u_3$$

$$= A_1 c_1 + A_2 c_2 + A_3 c_3,$$

the induced interference magnetic field $H_{IND}(t)$ satisfies:

$$H_{IND}(t) = H_e(t)\begin{pmatrix} c_4 u_1^2 + c_5 u_1 u_2 + c_6 u_1 u_3 + c_7 u_2^2 + \\ c_8 u_2 u_3 + c_9 u_3^2 \end{pmatrix}$$

$$= A_4 c_4 + A_5 c_5 + A_6 c_6 + A_7 c_7 + A_8 c_8 + A_9 c_9,$$

and the eddy current interference magnetic field $H_{EDDY}(t)$ satisfies:

$$H_{EDDY}(t) = H_e\begin{pmatrix} c_{10} u_1 u'_1 + c_{11} u_1 u'_2 + c_{12} u_1 u'_3 + c_{13} u_2 u'_1 + c_{14} u_2 u'_2 + \\ c_{15} u_2 u'_3 + c_{16} u_3 u'_1 + c_{17} u_3 u'_2 + c_{18} u_3 u'_3 \end{pmatrix}$$

$$= A_{10} c_{10} + A_{11} c_{11} + A_{12} c_{12} + A_{13} c_{13} + A_{14} c_{14} + A_{15} c_{15} +$$

$$A_{16} c_{16} + A_{17} c_{17} + A_{18} c_{18},$$

wherein $c_i, i=1, \ldots, 3$ is a compensation coefficient of the constant interference magnetic field; $A_i, i=1, \ldots, 3$ is an attitude term constituted by direction cosines; $H_e(t)$ is strength of a geomagnetic field, $c_i, i=4, \ldots, 9$ is a compensation coefficient of the induced interference magnetic field; $A_i, i=4, \ldots, 9$ is an attitude term constituted by corresponding direction cosines and $H_e(t)$; $u'_1$, $u'_2$ and $u'_3$ are derivatives of $u_1$, $u_2$ and $u_3$ with respect to time; $c_i, i=10, \ldots, 18$ is a compensation coefficient of the constant interference magnetic field; $A_i, i=10, \ldots, 18$ is an attitude term constituted by corresponding direction cosines and $H_e(t)$; and $u_1$, $u_2$ and $u_3$ are direction cosines, the direction cosines are cosine values of angles between a geomagnetic field vector and positive direction of three directional axes of an aircraft carrier coordinate system.

4. The magnetic compensation method according to claim 3, wherein the direction cosines $u_1$, $u_2$ and $u_3$ satisfy:

$$u_1 = \cos X(t) = T(t)/\sqrt{T(t)^2 + L(t)^2 + V(t)^2}$$

$$u_2 = \cos Y(t) = L(t)/\sqrt{T(t)^2 + L(t)^2 + V(t)^2}$$

$$u_3 = \cos Z(t) = V(t)/\sqrt{T(t)^2 + L(t)^2 + V(t)^2}$$

wherein $T(t)$, $L(t)$ and $V(t)$ are the outputs of the three-axis fluxgate magnetometer in three directions.

5. The magnetic compensation method according to claim 1, wherein the interference magnetic field of the aircraft at the optically pumped magnetometer satisfies:

$$H_d(t) = H_{PERM}(t) + H_{IND}(t) + H_{EDDY}(t)$$

wherein $H_d(t)$ the interference magnetic field of the aircraft at the optically pumped magnetometer; $H_{PERM}(t)$ is a constant interference magnetic field; $H_{IND}(t)$ is an induced interference magnetic field; and $H_{EDDY}(t)$ is an eddy current interference magnetic field; and the interference magnetic field comprises 18 items or some of the 18 items.

* * * * *